Feb. 8, 1949.  F. C. ISELY  2,460,827
TESTING RADIO ECHO EQUIPMENT
Filed May 4, 1942
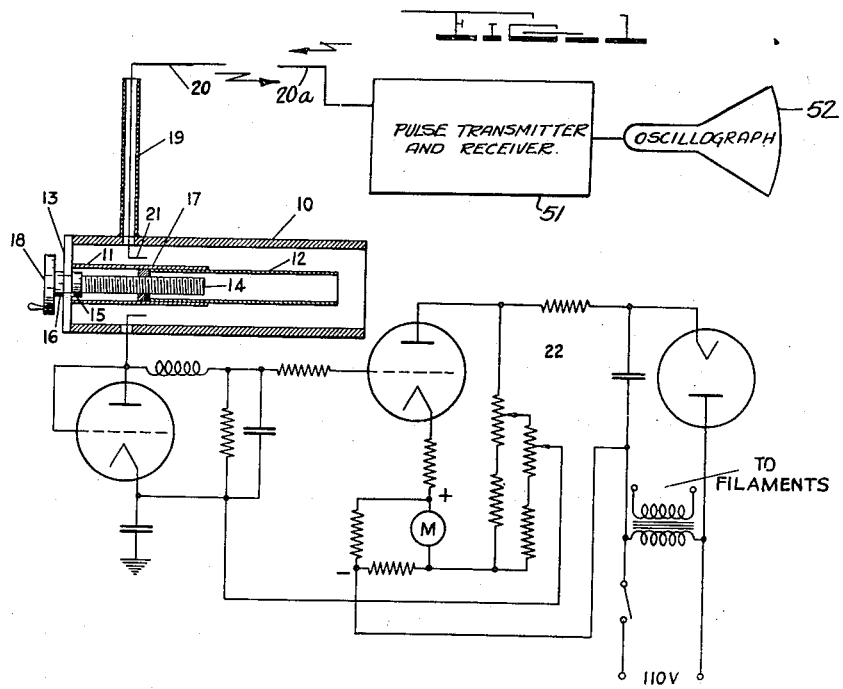
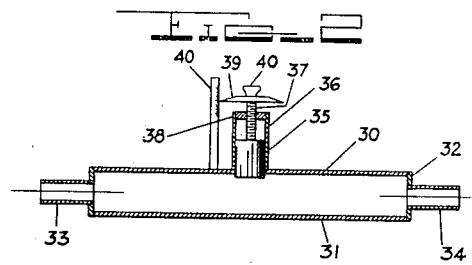
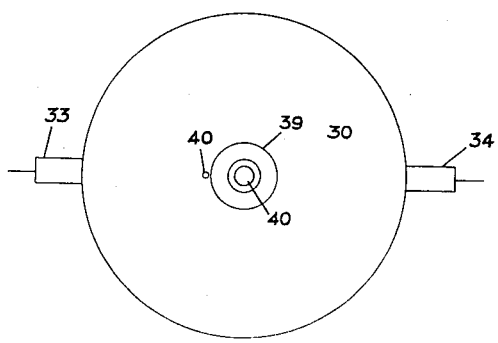
Inventor
*Frank C. Isely*
By
Attorney Patented Feb. 8, 1949

2,460,827

UNITED STATES PATENT OFFICE 2,460,827

TESTING RADIO ECHO EQUIPMENT

Frank C. Isely, Washington, D. C.

Application May 4, 1942, Serial No. 441,730

22 Claims. (Cl. 343—5)

(Granted under the act of March 3, 1883, as amended April 30, 1928; 370 O. G. 757)

This invention relates to a method and means for testing radio echo distance and direction finding equipment.

Such equipment normally operates by transmitting pulse type radio signals and receiving the reflections thereof from targets within the range of the equipment. When such equipment is in use on board a ship acting singly it is often impossible, though desirable, to check its operating condition and to insure that the receiver is synchronized with the transmitter.

The difficulty arises from lack of a target, since the dimensions of a ship are too small to afford reflections from distances which are within the indicating range of the equipment.

It is an object of this invention to provide a method and means whereby the operating condition of such equipment may be checked and the synchronization of its transmitter and receiver may be readily accomplished in the absence of a target within its indicating range.

It is a further object of this invention to provide such means in a form which is light in weight and small in size, so that it may either be permanently installed as a part of the radio echo equipment or may be maintained in portable units.

It is a further object of the invention to provide such means in a simple and rugged form requiring very little upkeep.

Other objects will become apparent from a careful consideration of the following description when taken together with the accompanying drawings, in which:

Fig. 1 is an elevational view in cross-section of a concentric line resonator and antenna forming a portion of one embodiment of the invention, shown with a schematic circuit diagram of a vacuum tube voltmeter and a pulse transmitter and receiver completing the embodiment;

Fig. 2 is an elevational view in cross-section of a wave guide type of resonator useful in another embodiment of the invention, and Fig. 3 is a plan view of the wave guide resonator of Fig. 2.

In general terms the invention involves the employment of a resonator having a sufficiently high value of Q when tuned to the frequency of the radio echo transmitter to produce oscillations for a greater length of time than that required by the receiver to recover from the reception of the transmitter pulse, thus enabling the receiver to produce on the oscillograph comprising a part of the standard radio echo equipment indications of the original pulse reradiated by the resonator.

Various types of resonators may be employed, depending upon the frequency of the radio echo equipment with which they are to be used. In Fig. 1 is shown, for example, a concentric line wave meter such as that disclosed in application, Ser. No. 500,230, for High frequency wavemeter, filed August 27, 1943 by John P. Hagen and Frank C. Isely. This type of resonator has a Q of around 2500 when tuned to a frequency of 200 mc., which allows the production of oscillations after an initial excitation to persist for a period of around 10 microseconds.

As shown in Fig. 1 the resonator comprises a cylindrical outer conductor 10 and an inner conductor composed of 2 telescopic sections 11 and 12. The outer conductor is open at one end, the other end being closed by a conductive end wall 13. Means are provided for tuning the resonator to different frequencies by varying the length of the inner conductor. This is accomplished by varying the amount of the telescoping of the two parts 11 and 12. The means for achieving this result comprises a threaded shaft 14 which passes through the center of end wall 13, being held from longitudinal movement therethrough by means of collars 15 and 16 fixed to the shaft. The telescoped end of part 12 of the inner conductor is formed with an end wall 17 having a threaded opening conforming to the threaded shaft 14. The shaft terminates outside the resonator in an adjusting knob or dial 18.

The resonator receives energy from the antenna 20a of a pulse transmitter and receiver 51 through a length of concentric transmission line 19, the outer end of the inner conductor of which is extended beyond the outer conductor to form a pickup and radiating antenna 20. The inner end of the inner conductor terminates inside the resonator in a pickup 21.

A peak voltmeter of conventional design generally indicated at 22 is utilized in connection with the resonator in order to facilitate the adjustment of the resonator to resonance with the transmitter.

While a resonator of the type shown in Fig. 1 is satisfactory for frequencies as high as 400 mc., for frequencies above this range it is necessary to employ types of resonators having a larger Q, since the Q required of the resonator increases with frequency. For this purpose resonators of the wave guide or resonant cavity type such as illustrated in Figs. 2 and 3 have been found satisfactory. The resonator illustrated in Figs. 2 and 3 comprises a thin drum-like cylinder having a large radius as compared to height and utilizing an adjustable piston as a tuning means. As shown, the cylinder is composed of top and bottom end walls 30 and 31 respectively and side wall 32. Concentric line pickups for the antenna and voltmeter communicate with the interior of the resonator at diametrically opposite points as shown at 33 and 34. The tuning means comprises a piston 35 snugly fitting inside a cylinder 36 extending outwardly from the end wall 30 and coaxially located with respect to the resonator. A threaded shaft 37 extends from the piston through a correspondingly threaded end wall 38 at the upper end of cylinder 36. The shaft 37 terminates at its upper end in a dial 39 and knob 40. The dial is provided on its periphery with a scale, and an upright post 41 bearing a scale is erected on the upper end wall 38 and positioned so that its scale cooperates with the scale formed on the dial. By this means very accurate adjustment of the tuning of the resonator may be accomplished, the scale on the dial 39 acting as a vernier to the scale of the post 41.

In use, the testing device is installed in close proximity to the radio echo equipment 51 with the antenna radiator 20 positioned within a few feet of the antenna 20a of the radio echo equipment. In operation the radio echo transmitter is employed in the usual manner, the resonator being tuned thereto by the use of the peak voltmeter. If the receiver is operating properly the resonator will cause to be produced on the oscillograph 52 forming a part of the equipment an indication extending over several microseconds beyond the time necessary for the receiver to recover and may cover a range on the oscillograph scale corresponding to a distance of several thousand yards. The length of the indication is a function of the synchronization of the receiver and the resonator, so that by tuning the receiver until the maximum length of indication is attained, the receiver may be synchronized with the resonator and the transmitter.

While the disclosure has been restricted to two embodiments of the invention, many variations are possible within the scope of the invention as defined by the appended claims. For example, any type of resonator having a sufficiently high value of Q may be employed and the voltmeter may be replaced by other indicating means such as an oscilloscope.

The invention described herein may be manufactured and used by or for the Government of the United States of America for governmental purposes without the payment of any royalties thereon or therefor.

I claim:

1. A method of testing and synchronizing a radio echo apparatus comprising a pulse transmitter, a receiver and an antenna, in the absence of a target, comprising the steps of operating the transmitter in a normal manner, intercepting the output of said transmitter at a point in close proximity to said antenna, reradiating said intercepted output for a time in excess of that required for said receiver to recover from saturation due to direct reception of said output, operating said receiver to receive said reradiated output and tuning said receiver to maximum response to said reradiated output.

2. A method of testing and synchronizing a radio echo apparatus comprising a pulse transmitter, a receiver and an antenna, in the absence of a target, which comprises the steps of operating said transmitter in the normal manner, intercepting the output of said transmitter at a point in close proximity to said antenna, applying said intercepted output to a resonator having a high value of Q, tuning said resonator to maximum response, radiating the output of said resonator, operating said receiver to receive the output of said resonator and tuning said receiver to maximum response thereto.

3. In a microwave pulse system, a transmitter of short pulses of electromagnetic energy, radiator means spaced at a desired distance from said transmitter for receiving the pulses of electromagnetic energy, an electromagnetic resonator, means coupling said resonator and said radiator means, said resonator being adapted to store energy from the pulses momentarily in a standing electromagnetic field, and a receiver adjacent said transmitter for receiving energy supplied from the standing electromagnetic field and reradiated from said radiator means over a period long compared to the pulses from the transmitter.

4. A method of testing and synchronizing a radio echo apparatus comprising a pulse transmitter, a receiver and an antenna, in the absence of a target, comprising the steps of operating the transmitter in a normal manner, intercepting the output of said transmitter at a point in close proximity to said antenna, reradiating said intercepted output for a time in excess of that required for said receiver to recover from saturation due to direct reception of said output, and operating said receiver to receive said reradiated output.

5. A method of testing the overall characteristics of a microwave pulse system, comprising radiating a short pulse of electromagnetic energy from the system under test, momentarily storing a portion of the radiant energy in a standing electromagnetic field, reradiating the stored energy over a period long compared to the initial pulse, receiving a portion of the reradiated energy by the system under test, and visually indicating the character of the received energy.

6. A method of testing the overall characteristics of a microwave pulse system, comprising radiating a short pulse of electromagnetic energy from the system under test, momentarily accumulating a portion of the radiated energy in a standing electromagnetic field thus altering its initial distribution in time, reradiating the accumulated energy, receiving a portion of the reradiated energy by the system, and utilizing for test purposes that portion of the received energy which is distinguishable from the initial pulse.

7. A means for introducing a time delay in the radiation path of a microwave pulse system having a transmitter producing short pulses of electromagnetic energy and a receiver for receiving said pulses, comprising a hollow conducting box coupled to said transmitter and adapted to contain an electromagnetic field excited by said pulses, said box being also coupled to said receiver for returning energy supplied by the electromagnetic field within said box towards said receiver for a period after the termination of the exciting pulse.

8. In an arrangement for testing microwave pulse systems, a transmitter of short pulses of electromagnetic energy, a receiver of electromagnetic energy placed adjacent said transmitter, and a conducting hollow box situated in the radiation pattern of the system and having a radiation pick-up element coupled thereto, said box being adapted to store momentarily a portion of the radiant pulse energy impinging on said element in an electromagnetic field contained therein before reradiating a portion of the energy to said receiver.

9. A method of testing the overall characteristics of a microwave object detection and location system comprising radiating electromagnetic energy from the system under test for a short period, momentarily storing a portion of the radiated energy in a standing electromagnetic field, reradiating the stored energy over a period long compared to the initial radiating period, receiving a portion of the reradiated energy by the system under test, and indicating the character of the received energy.

10. A means for introducing a time delay in the radiation path of a microwave object detection and location system having a transmitter and a receiver associated with the system, comprising a hollow conducting box coupled to said transmitter and adapted to contain an electromagnetic field excited by energy from said transmitter, said box being also coupled to said receiver for transferring energy supplied by the electromagnetic field within said box towards said receiver for a period after the termination of the exciting energy.

11. In a microwave object detection and location system, means for transmitting electromagnetic energy for a short period, radiator means spaced at a desired distance from said transmitting means for receiving the transmitted energy, an electromagnetic resonator, means coupling said resonator and said radiator means, said resonator being adapted to store energy in a standing eelctromagnetic field, and a receiver adjacent to said transmitter for receiving energy supplied from the standing electromagnetic field and reradiated from said radiator means over a period long compared to the transmitting period.

12. A method of testing a radio wave type object detector which comprises the steps of launching a quantity of wave energy from said detector into space, intercepting said wave energy and reradiating it over a period which is long as compared to the time required to launch it, and receiving and utilizing a portion of said reradiated energy at said detector.

13. A method of testing a radio wave type object detector which comprises the steps of launching a pulse of wave energy from said detector into space, intercepting said energy relatively near said detector and reradiating a version of it over a period which is longer than the duration of said pulse, and receiving and utilizing a portion of said reradiated energy at said detector.

14. A method of testing the overall characteristics of a pulse object detecting system which comprises the steps of radiating a relatively short pulse of electromagnetic energy, momentarily storing a portion of said energy in such fashion as to increase its initial distribution in time, reradiating a version of said stored energy, receiving said reradiated energy, and utilizing a portion of said received reradiated energy for test purposes.

15. A method of testing the overall characteristics of a pulse-type object-detecting system including a transmitter and a receiver in which a short pulse of electromagnetic energy is radiated and its reflected version is received, comprising the steps of momentarily storing a portion of the energy of said pulse and increasing its original distribution in time, and applying said stored energy to said receiver for test purposes.

16. Apparatus for testing a microwave object detector of the type wherein periodic pulses of radiant energy emitted by the detector are received in an adjacent receiver; said apparatus comprising a hollow resonator chamber coupled to said detector to receive a portion of said energy being constructed and arranged to momentarily store a portion of said energy and to return a portion of said stored energy to said receiver over a period which is time-displaced relative to the associated pulse received by said chamber.

17. A method of testing a radio echo-type object-detecting system having a transmitter adapted to produce a pulsed wave of electromagnetic energy and a receiver adapted to receive a reflected version of said pulsed wave, comprising the steps of storing energy derived from said pulsed wave and exciting said receiver by said stored energy over a period longer than the duration of the pulses of said pulsed wave.

18. A method of testing a radio echo-type object-detecting system having a transmitter adapted to produce a pulsed wave of electromagnetic energy and a receiver adapted to receive a reflected version of said pulsed wave, comprising the steps of producing an oscillating field adjacent said transmitter in response to said pulsed wave and having a duration greater than the pulses of said wave, and exciting said receiver after cessation of the pulses of said pulsed wave by energy derived from said oscillating field.

19. A method of testing a radio echo-type object-detecting apparatus having a transmitter adapted to produce a sequence of pulses of electromagnetic energy and a receiver adapted to receive the reflections of said pulses from a distant object, comprising steps of exciting an oscillating field by said pulses relatively near said apparatus and exciting said receiver in response to said field over a period which is longer than the duration of each of said pulses.

20. A method of testing the overall characteristics of a pulse echo-type object-detecting system which comprises the steps of producing a relatively short pulse of electromagnetic energy from said system, storing a portion of said energy in such fashion as to increase its initial distribution in time, receiving a version of said stored energy by said system, and utilizing a portion of said received energy for test purposes.

21. In a pulsed system, a transmitter of short pulses of electromagnetic energy, an electromagnetic resonator coupled to said transmitter to be excited by said pulses, said resonator being adapted to store energy from the pulses in the form of a standing electromagnetic field for a period longer than the duration of said pulses, and a receiver adjacent said transmitter and coupled to said resonator for receiving energy supplied from said standing electromagnetic field over a period long compared to the pulses from the transmitter.

22. A method of testing a radio echo-type object-detecting apparatus having a transmitter adapted to produce and radiate a pulse of electromagnetic energy and a receiver adapted to receive the reflection of said energy pulse from a distant object, comprising the steps of producing an oscillating field relatively near said transmitter in response to the output of said transmitter and for a period longer than that of said pulse, and exciting said receiver by said field after termination of said pulse.

FRANK C. ISELY.

REFERENCES CITED

The following references are of record in the file of this patent:

UNITED STATES PATENTS

| Number | Name | Date |
|---|---|---|
| 2,086,615 | Grundmann | July 13, 1937 |
| 2,134,716 | Gunn | Nov. 1, 1938 |

Certificate of Correction

Patent No. 2,460,827. February 8, 1949.

FRANK C. ISELY

It is hereby certified that errors appear in the printed specification of the above numbered patent requiring correction as follows:

Column 5, line 25, claim 11, for "eelctromagnetic" read *electromagnetic*; line 73, claim 16, before "being" insert the comma and words , *said chamber*;

and that the said Letters Patent should be read with these corrections therein that the same may conform to the record of the case in the Patent Office.

Signed and sealed this 27th day of September, A. D. 1949.

[SEAL]

THOMAS F. MURPHY,
*Assistant Commissioner of Patents.*